United States Patent [19]
Furlong et al.

[11] 3,899,553
[45] Aug. 12, 1975

[54] COOLING TOWER PLUME CONTROL

[75] Inventors: Donn B. Furlong, San Rafael; John C. Ovard, Santa Rosa, both of Calif.

[73] Assignee: Ecodyne Corporation, Lincolnshire, Ill.

[22] Filed: July 27, 1973

[21] Appl. No.: 383,219

[52] U.S. Cl. .............. 261/109; 165/174; 261/111; 261/DIG. 11; 261/DIG. 77
[51] Int. Cl. .............................................. F28c 1/00
[58] Field of Search...... 261/DIG. 77, DIG. 11, 111, 261/109; 165/174

[56] References Cited
UNITED STATES PATENTS

| | | | |
|---|---|---|---|
| 740,655 | 10/1903 | Hornbrook | 165/174 |
| 2,498,752 | 2/1950 | Copeland | 165/174 X |
| 2,709,580 | 5/1955 | Kameya | 261/111 |
| 3,635,042 | 1/1972 | Spangemacher | 261/DIG. 77 X |
| 3,780,999 | 12/1973 | Fordyce | 261/109 |
| 3,782,451 | 1/1974 | Cates | 261/DIG. 77 X |

Primary Examiner—Frank W. Lutter
Assistant Examiner—William Cuchlinski, Jr.
Attorney, Agent, or Firm—Joel E. Siegel; Charles M. Kaplan

[57] ABSTRACT

A cooling tower having a standard wet evaporative cooling tower combined with a dry heat exchanger system. The dry section includes a plurality of vertically spaced heat exchange tubes positioned directly above the packing area of the wet section. Water to be cooled flows through the tubes for preliminary cooling and then is directly distributed over the packing area of the wet section via nozzles associated with the lower ends of each tube. The heat exchange tubes are spaced a greater distance apart than ordinarily found in a typical heat exchanger to achieve maximum heat transfer and minimum pressure drop. The tubes are supported from their lower ends and fixed in place at their upper ends by a rubber grommet received through the water basin floor. A finned tubular insert is removably received through the upper end of each tube for control of the water flow. The air flow to both the wet and dry sections are controlled by mechanically adjustable louvers or dampers.

12 Claims, 6 Drawing Figures

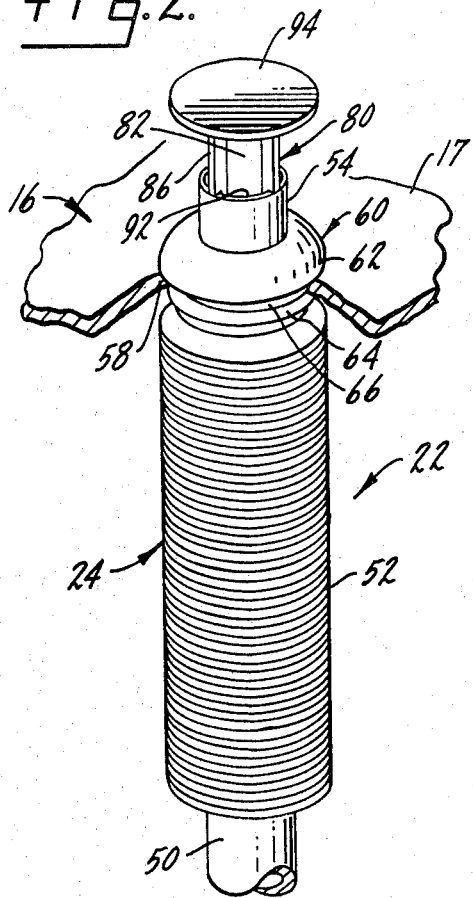
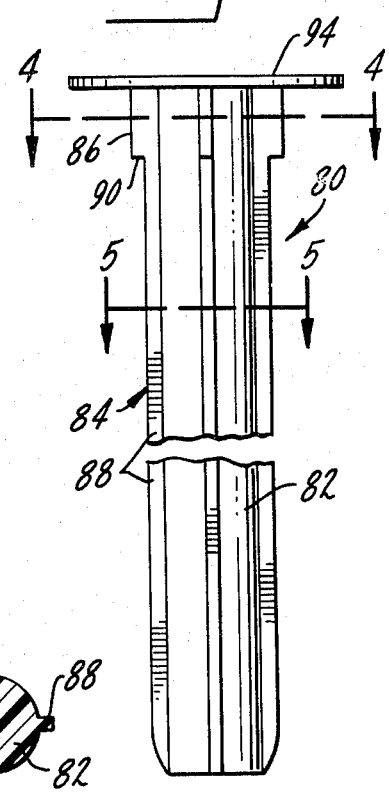
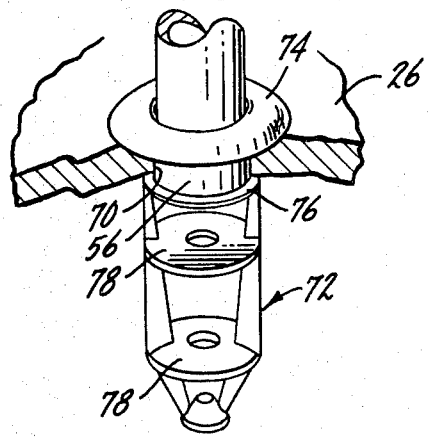
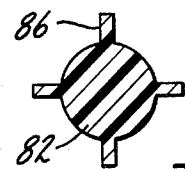
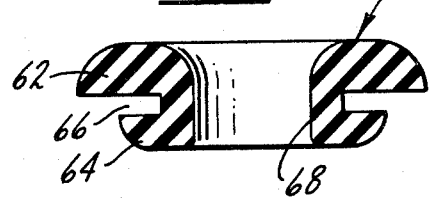

COOLING TOWER PLUME CONTROL

BACKGROUND OF THE INVENTION

This invention relates to the field of water cooling towers and more particularly to a cooling tower which alters the normal exhaust air temperature and moisture content so as to control or eliminate the fog plume, which can occur as the cooling tower exhaust vapor mixes with the atmosphere.

A cooling tower is somewhat unique in that both convective heat transfer and mass transfer of water vapor (evaporation) are involved in the heat exchange process. The transfer surface for heat exchange is established by direct contact of water and atmospheric air. It is the direct contact heat transfer mode that creates the potential for fogging. The normal exhaust air from a cooling tower is essentially a saturated air-water vapor mixture at an elevated temperature relative to the ambient air. On cold days the temperature differential between the exhaust air and the surrounding atmosphere results in cooling of the exhaust air as it enters the atmosphere. If the exhaust air becomes supersaturated, part of the water vapor must condense into small liquid droplets thus producing a visible fog plume condition.

Plume-atmospheric interaction phenomenon are best described by reference to a psychrometric chart. The saturation line described the locus of points where air is just saturated with water vapor. At points above this line air is super-saturated producing a visible fog condition. The cooling tower effluent-atmospheric air mixture follows the straight line between the state point describing the exhaust air condition and the state point describing the ambient air condition. Increased dilution and mixing is represented by increasing distance from the exhaust air condition toward the ambient condition on this line. Fog will exist as long as the ambient-exhaust mixture is in the super-saturated region.

Fog plumes are potentially objectionable since they may cause visibility or icing problems on nearby highways or residential areas and the condensation of water vapor on objects in the immediate vicinity of the tower may cause corrosion problems or failure of electrical equipment. They can also cause a public nuisance especially when a tower is located near any area with extensive human activity since people are sensitive to even minute quantities of water vapor or mist.

It has long been known that mist formation in steam locomotives working with condensers can be prevented by mixing warm flue gases of the locomotives with the exhaust steam. It has also been known to install an open gas-flame in the exhaust area of a cooling tower to increase the temperature of the exhaust air and thereby prevent the formation of fog as the exhaust air leaves the tower. Apparatus used for removing air polluting contaminants and condensible vapors from exhaust gases have utilized mixing sections which include heat exchangers to heat ambient air which is mixed with the exhaust gases for the purpose of reducing the relative humidity of the gases before they are admitted to the atmosphere. In areas where water is scarce it has also been known to use wet/dry cooling towers, which include dry air cooled heat exchanger sections, and wet evaporative sections, where the water to be cooled is fed downwardly transversely to the flow of air. The exiting air from the dry and wet sections are mixed and leave the tower through a common exhaust. This serves to reduce the relative humidity of the exhaust air from the wet section and also reduces water evaporation losses. Another heretofore known wet/dry cooling tower design utilizes a layer of horizontal finned tubes to heat the moist air prior to its issuance from the tower for the purpose of reducing or eliminating fog formation in the plume issuing from the tower. The water to be cooled passes through the finned tubes and is distributed over the wet section.

It is a primary object of the present invention to provide a cooling tower design which effectively reduces or eliminates the formation of a fog plume in the atmosphere.

Another object is to provide a wet/dry cooling tower design which reduces plume without substantially reducing the thermal performance capability of the cooling tower.

A further object of the present invention is to provide such a wet/dry cooling tower design which maximizes heat transfer efficiency in the dry section while minimizing the energy requirements for moving air through the dry section.

A still further object of the present invention is to provide such a wet/dry cooling tower design which includes a dry section having heat exchange finned tubes which may be quickly installed and removed for inspection and/or replacement.

Another object is to provide a wet/dry cooling tower design which simplifies water flow control between the wet and dry sections without requiring a separate distribution system.

Another object is to provide a wet/dry tower design which allows the system to operate totally wet for maximum thermal performance during the summer.

In accordance with the cooling tower design of the present invention, a standard wet evaporative cooling tower is combined with a dry heat exchanger system, commonly referred to as a wet/dry tower. The dry section, which includes a plurality of vertically spaced heat exchange tubes, is positioned directly above the packing area of the wet section. Water to be cooled flows directly from the water basin through the tubes for preliminary cooling and is then directly distributed over the packing area of the wet section via nozzles associated with the lower ends of each tube. The heat exchange tubes are spaced a greater distance apart than ordinarily found in a typical heat exchanger to achieve maximum heat transfer and minimum pressure drop. The tubes are supported from their upper ends and fixed in place by a rubber grommet received through the water basin floor for quick installation and removal of the tubes as well as for positive sealing. A finned tubular insert is removably received through the upper end of each tube for control of the water flow. The air flow to both the wet and dry sections are controlled by mechanically adjustable louvers or dampers. The entire system acts as a wet/dry tower being infinitely variable from total wet to total dry operation. The exhaust air from the wet and dry sections is mixed together prior to emission to the atmosphere so as to permit selective alteration of the temperature and moisture content thereof dependent upon atmospheric conditions to prevent the formation of fog plume.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein:

FIG. 2 is an enlarged perspective view of one of the heat exchange tubes illustrated in FIG. 1 showing the construction and mounting details thereof;

FIG. 3 is an elevational view of one of the flow control inserts;

FIG. 4 is a sectional view taken along line 4—4 in FIG. 3;

FIG. 5 is a sectional view taken along line 5—5 in FIG. 3; and

FIG. 6 is a sectional view of one of the flexible grommets used to support heat exchange tubes in place.

DESCRIPTION OF A PREFERRED EMBODIMENT

Figure 1:
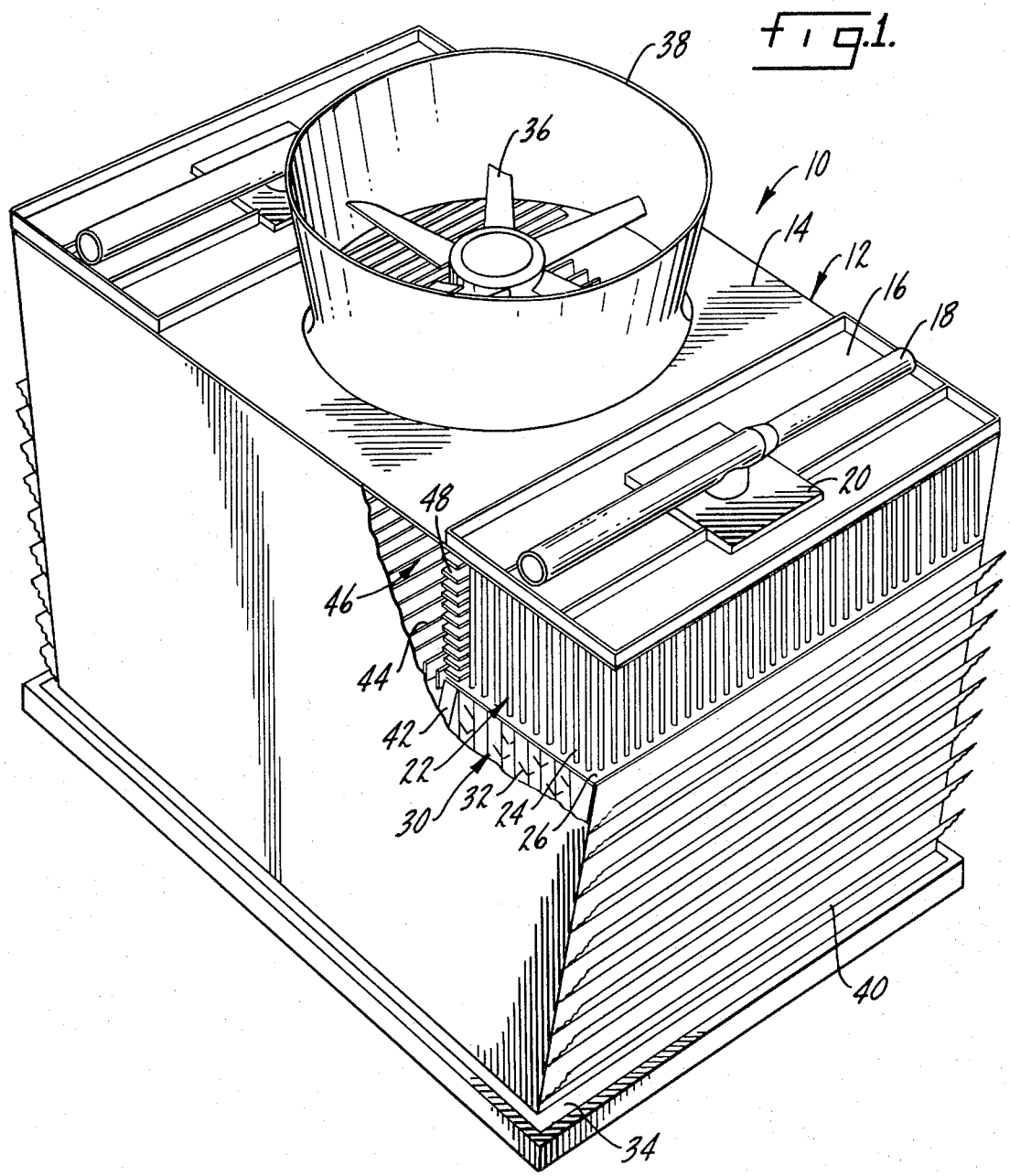
FIG. 1 is a perspective view of a cooling tower constructed in accordance with the present invention, partially broken away to shown internal details.

Referring to FIG. 1, an exemplary one cell wet/dry cooling tower constructed in accordance with the present invention is indicated generally at 10. To simplify the disclosure, only one half of the tower 10 will be disclosed; it being understood that the other half is the mirror image of the disclosed half. Tower 10 includes a housing 12 incorporating a top deck 14 defining a hot water distribution basin 16. Liquid, such as water to be cooled, is pumped into basin 16 through distribution pipe 18 and distribution box 20. Positioned immediately below basin 16 is a dry cooling section 22 which includes a plurality of vertically disposed finned heat exchange tubes 24 arranged in a plurality of transversely extending rows and mounted between the floor 17 of basin 16 and a horizontal partition deck 26. Liquid from basin 16 flows downward through tubes 24 serially into a wet cooling section 30 positioned immediately therebelow. After descending through well known fill or packing 32, conventionally supported within wet section 30, the cooled liquid is collected in a cold water collection basin 34 for removal to service.

A fan 36 rotated in stack 38 draws ambient air laterally through the tower for upward discharge via the stack. The air passes successively through openings between housing side wall inlet louvers 40, which are separately associated with both dry section 22 and wet section 30, and then through the respective dry and wet sections 22 and 30. The air passing through wet section 30 exits therefrom through a conventional drift eliminator assembly 42 and then upwardly through a movable louver or damper assembly 44, horizontally disposed in a central portion of the tower in facing relationship to stack 38 at an elevation substantially the same as the elevation of partition deck 26, into a centrally disposed plenum area 46 immediately below the stack 38. The air passing through dry section 22 exits through a movable louver or damper assembly 48, vertically disposed behind the finned tube section between the floor 17 of basin 16 and the partition deck 26, into plenum area 46. The exhaust air from dry section 22 and wet section 30 are mixed in plenum area 46 prior to discharge from the tower via stack 38 to the atmosphere. Movable louver assemblies 44 and 48 are preferably motor operated to permit selective adjustment thereof to control the ratio of air mix in the plenum area 46 which emanates from the dry and wet sections.

As best seen in FIG. 2, each finned tube 24 includes a central core 50 around which the fins 52 are formed in any well known manner. The upper ends 54 and the lower ends 56 of cores 50 are not finned to permit installation and support of the tubes 24. Upper ends 54 extend through corresponding openings 58 in floor 17 of basin 16. Positioned within each opening 58 is a flexible rubber grommet 60 having an upper portion 62 with an outer diameter substantially greater than the diameter of opening 58 and a lower portion 64 with an outer diameter slightly greater than the diameter of opening 58, as best seen in FIGS. 2 and 6. The annular recess 66 formed between upper portion 62 and lower portion 64 receives the peripheral edges which define opening 58 in a liquid sealing relationship. The upper ends 54 of cores 50 extend upward through openings 68 in grommets 60. Openings 68 are sized with slightly smaller diameters than the outer diameters of upper ends 54 to result in liquid seals. It has been the heretofore practice to space the tubes in a heat exchanger at a standard 2.39 inches on centers. The heat exchange tubes 24 are preferably spaced in the range of 4 to 9 inches on centers to achieve maximum heat transfer and minimum pressure drop. In vertical alignment with each lower end 56 is an opening 70 passing through partition deck 26. Spray nozzles 72, which are fitted and supported through each opening 70, include an upper flange 74 having a larger outer diameter than the corresponding opening 70 so as to permit the support of the nozzles 72 from the top surface of partition deck 26. The lower ends 56 of cores 50 extend down through flanges 74 and openings 70 and are in turn supported on the top surfaces of upper splash discs 76 formed integral with nozzles 72. Additional splash discs 78 are provided to obtain the required distribution pattern in a manner well known in the nozzle art.

To facilitate installation of the finned tubes 24, it is necessary that the unfinned upper ends 54 extend into dry section 22 a short distance below the level of the grommets 60. The upper ends 54 may then be inserted through openings 68 in grommets 60 a sufficient distance to permit the lower ends 56 to be positioned over the corresponding openings 70 and dropped into place through flanges 74 for support on flanges 76.

Referring to FIGS. 2–5, flow control inserts 80 are removably inserted into the upper ends 54 of each core 50. Insert 80 includes a solid central portion 82 having a diameter less than the internal diameter of core 50. A plurality of vertically extending ribs 84 are integrally formed to extend substantially the entire length of central portion 82. The upper portions 86 of ribs 84 extend outwardly beyond the lower portions 88 of ribs 84 to form a supporting surface 90. The outer diameter of insert 80 at the upper portions 86 is greater than the internal diameter of core 50 and the outer diameter of insert 80 at the lower portions 88 is substantially equal to the internal diameter of core 50. The inserts 80 are inserted into core 50, the lower portions 88 of ribs 84 extend downward into core 50 and are in contact with the inner surface thereof, surface 90 rests on the upper edge of core 50, and upper portions 86 extend upward into basin 16. A plurality of flow channels 92 are formed at the upper ends 54 of cores 50 which are defined between the inner surfaces of cores 50, the lower portions 88 of ribs 84, and the outer surfaces of central portions 82. When the liquid level within basin 16 reaches the upper edges of cores 50, liquid is caused to flow into channels 92 and drop down through the tubes 24 into nozzles 72. The location of the channels 92 adjacent the inner surfaces of cores 50 causes a film flow of water within the cores 50 which is substantially confined along the outer periphery thereof where maximum heat transfer takes place. Thus, the inserts 80 prevent the liquid from flowing straight down the centers of the cores 50 which would reduce the effective heat transfer as the liquid passes through the tubes 24. A disc 94 is formed integral with the upper edges of central portion 82 and ribs 84 and extends outward therebeyond to prevent foreign matter from entering channels 92.

In operation, hot water, which for example may be derived from a condenser forming a part of a power plant or the like, is directed through distribution pipe 18 and distribution box 20 into hot water distribution basin 16. Whereupon, when the level of such water reaches the tops of the upper ends 54 of the cores 50, it is caused to gravitate downwardly through the channels 92 of the inserts 80 and then down through the remainder of the heat exchanger tubes 24. Ambient air is caused to be drawn through the inlet louvers 40 associated with the dry section 22 past the finned tubes 24 at a preselected rate to partially cool the water gravitating downwardly through the heat exchange tubes 24 to a predetermined intermediate temperature. The dry exhaust air from the dry section 22 exits therefrom through dampers 48 and enter plenum 46.

The partially cooled water leaving the tubes 24 directly enters the corresponding nozzles 72 and contacts splash discs 78 which evenly distribute the water over the wet section 30. The gravitating water contacts the fill or packing 32 and is broken up, forms films of water thereover, and drips down into cold water collection basin 34. Ambient air is caused to be drawn through the inlet louvers 40 associated with the wet section 30 in direct contacting relationship with the gravitating water to cool the water not only by evaporation but also by sensible heat exchange. The moisture laden exhaust air from the wet section 30 exits therefrom through drift eliminators 42 and then enters plenum 46 through dampers 44. The parallel flow of exhaust air from the dry section 22 and the wet section 30 commingle and are mixed in plenum 46 for discharge in a combined state to the atmosphere via stack 38.

The mixture of air which is discharged through the stack 38 to the atmosphere must have a relative humidity sufficiently low that no condensation thereof occurs to produce a visible plume of fog at the temperature to which such stream of air is lowered by virtue of mixing thereof with the ambient atmosphere. When the ambient air is either at a cold ambient temperature or at a high relative humidity, or both, the formation of a plume is most apt to occur. However, when warmer, drier ambient air conditions are present, normally in the summer months, the formation of a plume is least likely to occur. Since evaporate cooling is more efficient than dry cooling, it is beneficial to operate the dry portion of the tower only when it is necessary for the abatement of plume. It is for this reason that the mechanically adjustable dampers 44 and 48 are provided to selectively control the flow of air respectively through the wet and dry sections between positions of fully open and fully closed.

During the normal summer operating mode, the dampers 48 are completely closed to prevent the flow of ambient air through the dry section and the dampers 44 are fully open which permits the tower to operate as a standard wet tower. As the ambient temperature drops during the winter months, the dampers 48 are opened to permit the flow of ambient air through the dry section which permits the tower to operate as a wet/dry tower. Dependent upon the temperature and relative humidity of the ambient air, the dampers 44 and 48 may be adjusted to control the ratio of dry air entering plenum 46 from dry section 22 and moist air entering plenum 46 from wet section 30 such that the combination has a relative humidity below the saturation curve on a psychrometric chart when mixed with the ambient air, so that little if any fog plume will be observed as a result of discharge of the mixture into the atmosphere. In extremely cold weather, the dampers 44 are closed preventing air flow through the wet section and dampers 48 are open to permit the tower to operate as a totally dry tower, and therefore no evaporation occurs and thus no plume fog problems are possible.

Since dry section cooling is inherently less efficient than wet section cooling, when the system is operated totally dry, or at some combination of wet/dry, the over-all cold water temperature are returned to the plant will be higher than it would be for the totally wet mode operation. However, it is usually not economical, practical or necessary from a fog control standpoint to design the system for totally dry operation. Usually a design level combination of wet/dry cooling with a stated maximum system cold water temperature can be selected which will eliminate fog plume problems without raising the cold water temperature above a level which reduces plant operating efficiency.

The wet/dry cooling tower 10, constructed in accordance with the present invention, effectively reduces visible fog plume under most operating conditions. By increasing the spacing of the heat exchange tubes 24 beyond that normally found in heat exchangers, a maximum heat transfer and a minimum pressure drop is achieved. A separate water flow system and flow control means are eliminated by directing the flow of water from the basin 16 directly through the heat exchange tubes 24 into nozzles 72 mounted directly below the lower ends of the tubes for distribution over the wet section. The flow control inserts 80 cause a film flow of water through the outer peripheries thereof to increase heat transfer. The heat exchange tubes 24 are uniquely suspended from flexible grommets 60 which provide for quick installation and removal of the tubes as well as positive support.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A wet/dry cooling tower for controlling plume emission to the atmosphere, comprising: a wet section and a dry section; said dry section being positioned immediately above said wet section; separate air inlet means associated with said wet section and dry section for respectively directing ambient air therethrough in a substantially horizontal direction; a hot water distribution basin positioned immediately above said dry section so as to define the upper portion of said dry section and a substantially horizontal partition deck separating said wet section from said dry section; a plurality of substantially vertical heat exchange tubes positioned within said dry section having upper ends which extend through openings in the floor of said basin for receipt of hot water therefrom and lower ends which extend through openings in said partition deck into said wet section; said lower ends of said heat exchange tubes having spray nozzle means directly secured thereto for receiving and spraying partially cooled water from said tubes over said wet section; a cold water collection basin positioned below said wet section for collecting cooled water passing through said dry section; movable louver means provided for selective control of ambient air flow through said wet and dry sections dependent upon atmospheric conditions; and a plenum area centrally disposed within said tower for receiving and mixing together the exhaust air passing through said wet and dry sections prior to its return to the atmosphere.

2. The invention as defined in claim 1 wherein said louver means includes a first louver assembly extending in a substantially horizontal direction across said plenum area at an elevation substantially equal to the elevation of said partition deck and a second louver assembly extending in a substantially vertical direction between said hot water basin and said partition deck.

3. The invention as defined in claim 1 wherein the upper ends of said heat exchange tubes are received within flexible grommets associated with each of said openings in said basin floor to facilitate installation and removal of said tubes.

4. The invention as defined in claim 1 wherein said upper ends of said heat exchange tubes which extend through said openings into said hot water basin receive finned tubular flow control inserts for control of water flow from said hot water basin into said heat exchange tubes.

5. The invention as defined in claim 4 wherein said flow control inserts include a central portion having a plurality of spaced apart vertically extending ribs formed integral therewith which contact the inner surfaces of said tubes so as to define flow channels therebetween.

6. The invention as defined in claim 5 wherein the upper portions of said ribs extend outwardly beyond the corresponding lower portions thereof so as to define supporting surfaces which rest upon the upper edges of said tubes.

7. The invention as defined in claim 1 wherein said heat exchange tubes are spaced apart a distance in the range of four to nine inches on centers to achieve maximum heat transfer and minimum pressure drop.

8. A wet/dry cooling tower for controlling plume emission to the atmosphere, comprising: a wet section and a dry section; said dry section being positioned directly above said wet section; separate air inlet means associated with said wet section and said dry section for respectively directing ambient air therethrough in a substantially horizontal direction; a hot water distribution basin positioned immediately above said dry section so as to define the upper portion of said dry section and a substantially horizontal partition deck separating said dry section from said wet section; a plurality of substantially vertical heat exchange tubes positioned within said dry section having upper ends which extend through openings in the floor of said basin for receipt of hot water therefrom and lower ends which extend through openings in said partition deck into said wet section; said upper ends of said heat exchange tubes being received within flexible grommets associated with each of said openings in said basin floor; said lower ends of said heat exchange tubes being received within nozzle means which are positioned to extend through said openings in said partition for receiving and spraying partially cooled water from said tubes over said wet section; a cold water collection basin positioned below said wet section for collecting cooled water passing through said wet section; and a plenum area centrally disposed within said tower for receiving and mixing together the exhaust air passing through said wet and dry sections prior to its return to the atmosphere; said plenum area having movable louver means associated therewith for selective control of ambient air flow through said wet and dry section dependent upon atmospheric conditions 9. The invention as defined in claim 8 wherein said louver means includes a first louver assembly extending in a substantially horizontal direction across said plenum area at an elevation substantially equal to the elevation of said partition deck and a second louver assembly extending in a substantially vertical direction between said hot water basin and said partition deck.

10. The invention as defined in claim 8 wherein said upper ends of said heat exchange tubes receive hollow finned tubular flow control inserts for control of water flow from said hot water basin into said heat exchange tubes.

11. The invention as defined in claim 10 wherein said flow control inserts include a central portion having a plurality of spaced apart vertically extending ribs formed integral therewith which contact the inner surfaces of said tubes so as to define flow channels therebetween.

12. The invention as defined in claim 11 wherein the upper protions of said ribs extend outwardly beyond the corresponding lower portions thereof so as to define supporting surfaces which rest upon the upper edges of said tubes.

* * * * *

UNITED STATES PATENT AND TRADEMARK OFFICE
CERTIFICATE OF CORRECTION

PATENT NO. : 3,899,553
DATED : August 12, 1975
INVENTOR(S) : Donn B. Furlong and John C. Ovard It is certified that error appears in the above-identified patent and that said Letters Patent are hereby corrected as shown below:

In column 1, line 28 the word "described" should read --describes--.

In column 6, line 9, the word "ba" should read --be--.

In column 6, line 25 the word "are" should be deleted.

In column 6, line 64 after the word "and" insert --said--.

In column 8, line 19 after the word "partition" insert --deck--.

Signed and Sealed this second Day of December 1975

[SEAL]

Attest:

RUTH C. MASON
*Attesting Officer*

C. MARSHALL DANN
*Commissioner of Patents and Trademarks*